(12) United States Patent
Osorio et al.

(10) Patent No.: US 12,215,237 B2
(45) Date of Patent: Feb. 4, 2025

(54) HIGH OPACITY WHITE INK

(71) Applicant: Sun Chemical Corporation, Parsippany, NJ (US)

(72) Inventors: Jarol Osorio, Charlotte, NC (US); Everett Garrish, Charlotte, NC (US)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 18/707,956

(22) PCT Filed: Dec. 22, 2022

(86) PCT No.: PCT/US2022/053803
§ 371 (c)(1),
(2) Date: May 7, 2024

(87) PCT Pub. No.: WO2023/129472
PCT Pub. Date: Jul. 6, 2023

(65) Prior Publication Data
US 2024/0409760 A1 Dec. 12, 2024

Related U.S. Application Data

(60) Provisional application No. 63/295,146, filed on Dec. 30, 2021.

(51) Int. Cl.
*C09D 11/104* (2014.01)
*B65D 65/42* (2006.01)
*C09D 11/033* (2014.01)
*C09D 11/037* (2014.01)

(52) U.S. Cl.
CPC ............ *C09D 11/104* (2013.01); *B65D 65/42* (2013.01); *C09D 11/033* (2013.01); *C09D 11/037* (2013.01)

(58) Field of Classification Search
CPC ... C09D 11/033; C09D 11/037; C09D 11/104; C08K 2003/2241
See application file for complete search history.

(56) References Cited

U.S. PATENT DOCUMENTS

| | | | |
|---|---|---|---|
| 6,200,375 B1 | 3/2001 | Guez | |
| 7,842,131 B2 | 11/2010 | Blumel | |
| 2004/0025749 A1 | 2/2004 | Drews-Nicolai | |
| 2019/0144604 A1* | 5/2019 | Krishnan | C09D 11/107 522/179 |
| 2021/0079237 A1* | 3/2021 | Osorio Murillo | B41M 1/30 |

FOREIGN PATENT DOCUMENTS

| | | | |
|---|---|---|---|
| CN | 107082883 A | 8/2017 | |
| JP | H06116526 A | 4/1994 | |
| JP | 2005225932 A | 8/2005 | |
| JP | 2005307071 A | 11/2005 | |
| WO | WO-2019126006 A1 * | 6/2019 | B41M 1/10 |

OTHER PUBLICATIONS

International Search Report issued in International Application No. PCT/US2022/053803, mailed Mar. 27, 2023.
Written Opinion of the International Searching Authority issued in International Application No. PCT/US2022/053803, mailed Mar. 27, 2023.
G. D. Parfitt, The Role of the Surface in the Behaviour of Titanium Dioxide Pigments Croatica Chemica Acta conference paper, Oct. 15, 1979.
International Preliminary Report on Patentability (Chapter II of the Patent Cooperation Treaty) issued in International Application No. PCT/US2022/053803, mailed Dec. 26, 2023.

* cited by examiner

*Primary Examiner* — Vu A Nguyen
(74) *Attorney, Agent, or Firm* — Marian E. Fundytus; Ostrolenk Faber LLP

(57) ABSTRACT

The present invention provides a high opacity solvent based white ink or coating composition that provides high levels of opacity to substrates used for packaging materials that are printed via flexography or gravure. The ink or coating composition contains up to 75 wt % titanium dioxide, while still having a viscosity suitable for flexographic and gravure printing methods.

20 Claims, No Drawings

HIGH OPACITY WHITE INK

CROSSREFERENCE TO RELATED APPLICATIONS

The present application claims priority to U.S. Provisional Application No. 63/295,146, filed 30 Dec. 2021, which is hereby incorporated in its entirety.

FIELD OF THE INVENTION

The present invention is related to high opacity white solvent-based ink and coating compositions. The inks have a high solids content, and are suitable for printing methods that require low viscosity compositions.

BACKGROUND OF THE INVENTION

Titanium dioxide pigments are widely used in coating systems where high levels of opacity and hiding power are required and to provide whiteness, brightness and other visual features.

In the packaging industry, e.g., packaging for foods, beverages, pharmaceuticals, cosmetics, household products, tobacco, etc., there is a need for white inks that provide high levels of opacity to hide undesired visual effects, protect the packaged good from exposure to visible light, or provide maximum whiteness. Titanium dioxide has been useful in providing all these properties for many years. However, recent advancements in packaging technology has exposed the need for improvement in white, opaque inks.

For example, the opacity levels of currently available white inks decrease when an article upon which the ink is printed is over-coated with a lacquer or adhesive. This is becoming a larger issue as laminates and cold seal packaging find greater use. One limitation of currently available white inks is that the use of higher load levels of $TiO_2$ pigment, e.g., higher than 50 wt % pigment, to increase opacity and hiding power is not commercially feasible, especially in inks requiring lower viscosities, e.g., flexographic or gravure inks.

G. D. Parfitt, The Role of the Surface in the Behaviour of Titanium Dioxide Pigments CROATICA CHEMICA ACTA conference paper, Oct. 15, 1979, offers a brief introduction to the preparation of surface coated titanium dioxide pigments. The surface of the majority of titanium dioxide pigments is not titanium dioxide. For example, due to the fact that titanium dioxide is a strong absorber of ultra violet light and can act as a catalyst in the photodegradation of pigmented paint films by sunlight, the surface of most pigments is covered with a layer of one or more inorganic oxides. The oxide layer forms a barrier to the transfer of excited species, formed during irradiation, from the pigment to the organic component of the coating. The choice of oxide(s) is important since the layer must be efficient in reducing the catalytic effect, while it also must provide a surface that is compatible with the components of a liquid medium, e.g., polymeric components, to ensure efficient dispersion.

Initial dispersion of a pigment breaks up aggregates/agglomerates of small pigment particles that disperse into the liquid. Once dispersed, the particles are free to move throughout their new environment, but flocculation may cause reformation of agglomerates. Surface treatments for the $TiO_2$ particle have been designed to alter the nature of the pigment/liquid interface to maintain good dispersion and prevent flocculation, which typically provides good opacity.

Most surface treatments are formed as inorganic coatings from metal oxides, but in addition to an inorganic coating, one may treat the pigments during the final stages of manufacture with an organic compound, frequently a polyol or an amine.

In an ink, the surface of the pigment interacts predominately with a binder or binders. The interactions between a surface treatment and a binder will not necessarily be the same as the interactions between the same surface treatment and a different binder, e.g., a binder having a different chemistry. The differences may be subtle, and sometimes pigments surface treated for increased performance in one area, may show unexpected activity when used in a different way.

Surface treatments for titanium dioxide have been designed to give rise to or enhance a variety of $TiO_2$ features in addition to dispersibility, e.g., whiteness, brightness, coverage, retention, gloss, etc. As a result, a large number of treated pigment grades are available, depending on the desired properties and end use.

U.S. Pat. No. 7,842,131 discloses a high opacity rutile titanium dioxide pigment having a surface coating that contains aluminum phosphate, aluminum oxide, silicon oxide and titanium oxide for use in decorative laminating papers.

US 2004/0025749 discloses a method for the surface treatment of a titanium dioxide pigment, in which a component containing phosphorus, titanium and aluminum is applied first by precipitation, followed by a magnesium component at a pH value of 8 to 10. These pigments are said to display improved light-fastness and high opacity.

U.S. Pat. No. 6,200,375 discloses a weather-resistant titanium dioxide pigment for outdoor coatings, where the surface of the particles has consecutive layers of zirconium hydroxide, titanium hydroxide, phosphate/silicon and hydrous aluminum oxide.

US 2021/0079237 discloses a solvent-based high opacity white ink, suitable for use on packaging for packaged goods, wherein the opacity of the ink is increased by the incorporation of additional opacifying agents, e.g., polymeric void hollowsphere particles. The inks and coatings may also include mica-based pigments and aluminum pigments.

Although progress in high opacity inks continues to be made, currently available inks do not meet the current needs for higher opacity. Thus, there is still a need to develop opaque inks and coatings with improved opacity. A convenient way to prepare inks that contain more than 40 wt %, or more than 50 wt %, titanium dioxide, in order to increase opacity while maintaining a low viscosity is needed, as is a white ink that maintains the high opacity after being over-coated with a lacquer or adhesive. The present invention provides a solution for both these needs.

SUMMARY OF THE INVENTION

The invention provides a high opacity solvent based white printing ink composition comprising:
  5 to 15% by weight, based on the total weight of the ink composition, of a resin component, wherein the resin component comprises one or more alcohol soluble polyester resins, wherein at least one alcohol soluble polyester resin is substituted by hydroxyl groups;
  35-75% by weight, based on the total weight of the ink composition, of a $TiO_2$ pigment; and
  a solvent comprising one or more alcohol solvents;
  wherein the ink has a un-reduced viscosity of from 15-500 centipoise, or 15 seconds #2 EZ Zahn cup to 60 seconds

3 EZ Zahn, and a reduced print viscosity of from about 10-80 cps, or 15 seconds #2EZ Zahn to 35 seconds #2EZ Zahn Cup, suitable for flexographic or gravure printing; and when printed and dried, forms an ink film or layer that exhibits a 10% or lower loss in opacity when over-coated with an adhesive or lacquer.

The amount of $TiO_2$ in the ink composition is high. In many embodiments the $TiO_2$ pigment is present at 50 wt % or more, often more than 55 wt %, e.g., 60 wt % or more, which is a higher load level than available in currently available flexographic or gravure inks.

In addition, the viscosity of the ink is surprisingly low, especially in light of the higher amounts of $TiO_2$, in many embodiments, from 50 to 100 cps, or 25 to 35 seconds #2 EZ Zahn, unreduced. This is likely due to the manner in which the alcohol soluble hydroxylated polyester resin binder, and the surface of the selected $TiO_2$ pigment interact. Nevertheless, the present ink often has a surprisingly high $TiO_2$ content while maintaining a surprisingly low viscosity.

The solvent comprises at least one alcohol solvent, e.g., propyl alcohol, ethyl alcohol, diacetone alcohol, etc., which is useful in dissolving resins in the ink and providing the drying profile required for flexographic and gravure printing. In some embodiments, the solvent may also comprise one or more acetate esters, ethers, glycols, glycol ethers, ketones, aldehydes, aliphatic hydrocarbons, cyclic hydrocarbons or aromatic hydrocarbons. In general, the solvent comprises one or more alcohols, optionally with one or more acetate esters, ethers, glycols, glycol ethers, ketones or aldehydes.

In addition to high opacity and low viscosity, the inks also exhibit good adhesion, film forming properties and performance properties. One surprising aspect of the invention is that, not only do the inks exhibit high opacity, they retain their high opacity after being over-coated with lacquer or adhesive, e.g., cold seal release lacquers and adhesives for preparing laminates. As discussed above, this is a significant improvement for printed materials used in packaging.

Also provided is a method of preparing a printed substrate, the printed substrate resulting from the method, and a printed substrate which is used as a packaging material, for example, a food packaging material.

DETAILED DESCRIPTION OF THE INVENTION

The present invention provides a high opacity solvent-based white ink or coating composition, with very high $TiO_2$ levels, which ink retains its high opacity when over-coated with an adhesive or lacquer.

The compositions contain a high level of titanium dioxide, one or more binders, wherein one of the binders is a hydroxyl substituted polyester resin, and an alcoholic solvent. The high solids, high opacity printing ink of the invention has surprisingly low viscosity and is suitable for application by flexographic or gravure printing methods, and other methods of application. The printing ink also retains the high level of opacity when over-coated by an additional coating, lacquer or adhesive, and can be used for printing on packaging articles for food, cosmetics, etc.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, "substrate" means any surface or object to which an ink or coating can be applied. Substrates include, but are not limited to, paper, fabric, leather, textiles, felt, concrete, masonry, stone, plastic, plastic or polymer film, glass, ceramic, metal, wood, composites, combinations thereof, and the like. Substrates may have one or more layers of metals or metal oxides, or other inorganic materials, and some substrates are flexible.

As used herein "article" or "articles" means a substrate or product of manufacture. Examples of articles include, but are not limited to: substrates such as paper, fabric, leather, textiles, felt, concrete, masonry, stone, plastic, plastic or polymer film, glass, ceramic, metal, wood, composites, and the like; and products of manufacture such as publications (e.g., brochures), labels, and packaging materials (e.g., cardboard sheet or corrugated board), containers (e.g. bottles, cans), clothing, a polyolefin (e.g., polyethylene or polypropylene), a polyester (e.g. polyethylene terephthalate), a metalized foil (e.g., laminated aluminum foil), metalized polyester, a metal container, and the like.

As used herein, the terms "inks and/or coatings," "inks and coatings," "inks or coatings," "inks," and "coatings" are used interchangeably.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended. It is to be understood that wherein a numerical range is recited, it includes the end points, all values within that range, and all narrower ranges within that range, whether specifically recited or not.

As used herein, the term "polymer" includes both homo- and co-polymers. The resins used as binders in the present invention are polymeric in nature and when discussing binders of the invention, the terms "polymer" and "resin" are interchangeable.

As used herein, the term "opacity" of a pigmented ink or coating refers to its ability to cover the color or color differences of a substrate. Opacity depends on the amount of light that is transmitted through, or reflected from, the surface of the ink. More opaque colorants have a greater tendency to reflect and refract light.

Throughout this disclosure, all parts and percentages are by weight (wt % or mass % based on the total weight) and all temperatures are in ° C. unless otherwise indicated.

Compositions and Uses Thereof

The present invention provides a high opacity solvent based white printing ink composition comprising:
- 5 to 15%, e.g., 6 to 12% by weight, based on the total weight of the ink composition, of a resin component, wherein the resin component comprises one or more alcohol soluble polyester resins, wherein at least one alcohol soluble polyester resin is substituted by hydroxyl groups;
- 35-75%, e.g., 40 to 70%, by weight, based on the total weight of the ink composition, of a $TiO_2$ pigment; and
- a solvent comprising one or more alcohol solvents.

The opacity will vary with the volume of ink put down, e.g., with a 250/6.36 LPI/BCM Harper Anilox opacity is 65% Contrast Ratio Opacity, or 60 via BNL-3 Opacity Meter.

The ink has an un-reduced viscosity of from 15-500 centipoise, or 15 seconds #2 EZ Zahn cup, to 60 seconds #3 EZ Zahn cup, and a reduced print viscosity of from about 10-80 cps, or 15 seconds #2EZ Zahn to 3 seconds #2EZ Zahn Cup, suitable for flexographic or gravure printing. In some embodiments, the ink has a viscosity of 15-35 seconds #2 EZ Zahn Cup. The inks of the present application comprise at least one polyester resin with a low viscosity and at least one soft (i.e., low Tg) polyester to ensure good adhesion, flexibility, and low viscosity.

When printed and dried, the ink forms a film or layer that exhibits a 10% or lower, e.g., 5% or lower, loss in opacity when over-coated with an adhesive or lacquer.

In some embodiments, the $TiO_2$ pigment is present in an amount of from 40 to 70%, 45 to 70%, 50 to 70% or 60 to 70% by weight based on the total weight of the ink composition.

In some embodiments the $TiO_2$ pigment is present in an amount of from 40 to 60 or 65%, 45 to 60 or 65%, 50 to 60 or 65%, 55 to 60 or 65%.

In some embodiments the $TiO_2$ pigment is present in an amount of from 40 to 65% or 45 to 55%, by weight based on the total weight of the ink composition or in an amount greater than or equal to 45, 50, 55 or 60% by weight based on the total weight of the ink composition.

Many efforts have been made to improve various performance features of $TiO_2$ pigments by developing new or more complex surface treatments, by applying more than one surface treatment, by using thinner or thicker layers of a surface treatment, etc. For example, one commonly used titanium pigment for high hiding power, Ti-Pure R-931 $TiO_2$ pigment, contains a large amount of surface treatment and therefore only 80% by weight of the pigment is $TiO_2$. A greater amount of surface treatment spaces the $TiO_2$ particles out and gives greater hiding power but lower gloss. A standard, gloss-grade $TiO_2$ pigment, such as TR-52, can contain up to 95% $TiO_2$, with very little surface treatment. TIOXIDE RDE-4, from Venator, is a rutile $TiO_2$ pigment with an alumina-silica polyol surface treatment. TIOXIDE RDE-4 contains 85.5% $TiO_2$, and a moderate amount of surface treatment falling in between the highest opacity pigments and gloss-grade pigments.

The $TiO_2$ pigment of the invention typically comprises from 80 to 95 wt % $TiO_2$, often from 82 to 92 wt % $TiO_2$. In some embodiments, the $TiO_2$ pigment surface treatment comprises, alumina, silica and an organic component such as a polyol.

As discussed above, the resin chemistry also plays a large role in determining the properties of the pigment in use. In the present invention, excellent results in pigment load level, viscosity, hiding power, printability, gloss, opacity and opacity retention have been obtained when combining an alcohol soluble polyester resin substituted with hydroxyl groups, e.g., Reactol 5145 A from Lawter, and a $TiO_2$ pigment with a moderate amount of surface treatment, as described above, e.g., TIOXIDE RDE-4 from Venator. Other grades of $TiO_2$ may also be used in the present invention, and additional resins may also be present.

The addition of other resins is optional, and, depending on desired end-use properties, may include additional polyesters, polyurethanes, alkyds, phenolics, nitrocellulose, polyamides, vinyls, acrylics, rosin esters, styrenes, melamine-formaldehydes, etc.

US20110027543 describes a polyurethane resin which is said to be particularly suitable in printing inks for laminating packaging applications. The polyurethane resin maintains its lamination bond strength before and after the printed laminate is subjected to sterilization conditions. Select polyurethanes may therefore be of interest as additional binders in the present invention. For example, excellent results have been obtained in inks comprising the hydroxylated polyester resin, Reactol 5145 A from Lawter, the aliphatic film forming polyether urethane resin NeoRez® U-475 from DSM, and the titanium dioxide pigment TIOXIDE RDE-4 from Venator.

The inks of the present invention exhibit high opacity. In many embodiments, the inventive inks exhibit a higher opacity than existing white inks, for example, 10% higher opacity or more. In order to attain this level of opacity, a high $TiO_2$ loading is used, e.g., the ink will often contain more than 45, more than 50, more than 55, or more than 60% by weight $TiO_2$ pigment based on the total weight of the ink composition. Not surprisingly, the inks have high solids content, e.g., generally higher than 60 or 65% solids, often higher than 70 or 75% solids.

The inks of the present invention have a surprisingly high Pigment/Binder ratio, typically from 4:1 to 8:1 by weight, e.g., about 6:1. This is higher than would often be seen in other whites, which may be at least partly due to the interactions of the hydroxyl substituted polyester binder with the surface of the pigment. A high P/B ratio with a well-dispersed pigment typically provides low viscosity and high opacity.

The inks of the present invention comprise one or more solvents. One class of solvents used in the inks of the present application is alcohols, e.g., propyl alcohol, ethyl alcohol, diacetone alcohol among others. Alcohols are useful in dissolving the resins of the present invention as well as helping to provide the drying profile needed in flexographic and gravure printing processes, especially high-speed flexo and gravure printing. Other solvents may be suitable for the inks of the present invention, including acetate esters, such as propyl acetate, ethers, glycols, glycol ethers, such as ethoxypropanol, ketones, aldehydes, aliphatic hydrocarbons, cyclic hydrocarbons or aromatic hydrocarbons, etc. In many embodiments, the solvents comprise alcohols, acetate esters, ethers, glycols, glycol ethers, ketones or aldehydes.

The present application describes high opacity solvent-based white ink compositions that provide high levels of opacity to substrates used for packaging of goods, typically printed via the flexography or gravure methods. Not only do the present inks provide higher opacity than currently available inks when printed, the present inks also maintain the opacity better than existing inks after being over-coated with, e.g., a lacquer or adhesive. Typically, the inks of the invention lose less than 10% of their opacity when overcoated, often less than 5% opacity is lost. In a specific embodiment, the inks of the present application yield higher opacity than current white inks for candy wrapper packaging structure and again, retain their high opacity after being overcoated with CSRL (cold seal release lacquer) and cold seal adhesive.

There is no specific limitation to the adhesives and CSRL's that can be used to overcoat the inks of the present invention in preparing a finished printed article, especially a packaging article. Adhesives and CSRL's supplied by Bostik and Dow, for example, are widely used for this type of application.

The inks of the present invention are preferably high opacity white inks, but one can incorporate other colorants to tint the white or provide a pastel color. The colorant may be organic or inorganic and may be a dye or pigment. Typical examples of useable colorants include, but are not limited to, inorganic pigments, such as Pigment White 6 (Titanium Dioxide), Pigment Black 7 (carbon black), Pigment Black 11 (Black Iron Oxide), Pigment Red 101 (Red Iron Oxide) and Pigment Yellow 42 (Yellow Iron Oxide), and organic pigments such as Pigment Yellow 1, Pigment Yellow 3, Pigment Yellow 12, Pigment Yellow 13, Pigment Yellow 14, Pigment Yellow 17, Pigment Yellow 37, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment 26Yellow 126, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 112, Pigment Red 146, Pigment Red 170, Pigment Red 196, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 23 and the like.

The colorant employed in the inks of the present application may be any FD&C or D&C pigment. Preferred FD&C pigments include FD&C Red No. 40, FD&C Yellow No. 5, FD&C Yellow No. 6 and FD&C Blue No. 1. Preferred D&C pigments include D&C Red No. 6, D&C Red No. 7, D&C Red No. 21, D&C Red No. 22, D&C Red No. 27, Red No. 28, D&C Red No. 30, D&C Red No. 33, D&C Red No. 34, D&C Red No. 36, D&C Orange No. 5 and D&C Yellow No. 10.

When present, non-white colorants are generally used for tinting purposes, and, typically, would be present at about 0.1 wt % to about 3 wt %, based on the total weight of the composition. For example, the colorants would be present in an amount of about 0.1 wt % to about 1 wt %, based on the total weight of the composition.

The inks of the present application may contain the usual extenders such as clay, talc, calcium carbonate, magnesium carbonate or silica to adjust rheology or other properties.

As with most ink and coating compositions, additives may be incorporated to enhance various properties. A partial list of such additives includes but is not limited to adhesion promoters, silicones, light stabilizers, optical brighteners, de-gassing additives, ammonia, flow promoters, defoamers, antioxidants, stabilizers, surfactants, dispersants, plasticizers, rheological additives, waxes, silicones, etc.

White pigment, especially $TiO_2$, is a key material in the inks of the present invention as $TiO_2$ imparts high opacity to inks when used in large amounts. While it is known to formulate inks, including flexo and gravure inks, with $TiO_2$ amounts up to approximately 30-50%, a $TiO_2$ pigment load above that range will typically lead to inks that are too viscous or do not contain an adequate pigment:binder ratio to either print well or provide the needed end use resistance properties. One of the advantages of the formulations of the present invention is that they contain up to 55% or up to 75% $TiO_2$ while still being at a printable viscosity and having the requisite adhesion and performance properties, for instance for use in printed lamination and cold seal release lacquer (CSRL) structures.

The inks also exhibit good adhesion, film forming and performance properties. One of the surprising aspects of the invention is that, not only do the inks exhibit high opacity, they retain their high opacity after being over-coated with lacquer or adhesive, etc.

EXAMPLES

The invention is further described by the following non-limiting examples which further illustrate the invention, and are not intended, nor should they be interpreted to, limit the scope of the invention.

Application of Ink and Coating Compositions

The ink and coating compositions were applied using a Harper HD Phantom bladed proofer with 200 LPI/9.12 BCM anilox or 250 LPI/3.36. After application, the ink and coating compositions were dried to produce a coating on the substrate, and tested.

Viscosity

Viscosity in the following Examples was measured using a #2 EZ Zahn cup. Viscosity is reported both in "cps" and as Zahn number, which is the time in seconds for a volume of 100 ml to flow through the orifice.

Opacity

Contrast Ratio % Opacity was measured with XRite Spectrophotometer and iControl software. BNL Opacity was measured with a TECHNIDYNE TEST/Plus Opacity Meter.

Sunlam NS2033/Sunlam HA 376 are a Sun Chemical adhesive/catalyst for lamination structures.

NULAM WHITE PRIMER is a commercial, lower opacity white primer that improves the adhesion of the High Opacity Whites to the substrate.

Example 1: Preparation of an Opaque White Ink of the Invention

An opaque white in of the invention was prepared according to the formulation in Table 1.

TABLE 1

Inventive High Opacity White Printing Ink Composition

| Material | % |
|---|---|
| NORMAL PROPYL ALCOHOL | 12.3 |
| ETHYL ALCOHOL | 4 |
| NORMAL PROPYL ACETATE | 2.4 |
| ALCOHOL SOLUBLE HYDROXYLATED POLYESTER RESIN | 5 |
| POLYESTER SOLUTION | 3.6 |
| TITANIUM DIOXIDE PIGMENT | 60 |
| Neorez U-475 POLYURETHANE SOLUTION | 4.4 |
| ETHOXYPROPANOL | 2.5 |
| DIACETONE ALCOHOL | 3 |
| ACETYL TRIBUTYL CITRATE PLASTICIZER | 2 |
| GLYCOL ETHER SOL VENT | 0.8 |
| Total | 100 |

Table 2 compares properties of the ink from Ex. 1 with SL-800 STD White, a commercial SB high opacity flexo white ink (Sun Chemical) used for packaging applications; and a commercial high opacity laminating white ink (used by Sun Chemical)

TABLE 2

Comparison of the properties if the white inks

| | SL-800 STD White | Laminating STD White | Ex. 1 |
|---|---|---|---|
| Total Solids | 51% | 55% | 70% |
| Initial Viscosity | 35 sec #2 EZ | 34 sec #2 EZ | 30 sec #2 EZ |
| TiO$_2$ Content | 53% | 47% | 60% |

Adhesive Lamination Test Method/Structure

Ink viscosities were reduced to 27-28 seconds #2 Zahn EZ Cup with 80/20 N-Propanol/N-Propyl Acetate Blend and reverse printed, side-by-side (2 inks printed simultaneously) on PET film with 200 LPI/9.12 BCM Anilox on Harper bladed handproofer. After drying, Contrast Ratio % Opacity was measured with XRite Spectrophotometer and iControl software.

A blend of Sunlam NS2033 Adhesive/Sunlam HA 376 Hardener at a 2:1 ratio was applied to the printed area with a #4 Meyer Rod, to a coat weight of approximately 1.1 lb/ream. A section of PE film was placed over the applied adhesive blend as a backing substrate and air bubbles were removed to form an adhesive lamination. Contrast Ratio was measured again. The results are shown in Table 3.

TABLE 3

Opacity Comparison

| Adhesive Lamination NS2033/HA376 | Contrast Ratio % Opacity | | |
|---|---|---|---|
| | Pre-Lamination | Post-Lamination | Difference |
| SL-800 STD White | 65.1 | 62.9 | -2.2 |
| Laminating STD White | 79.4 | 69.7 | -9.7 |
| Ex. 1 | 70.3 | 70.1 | -0.2 |

Table 2 shows that the drop in opacity after adhesive lamination is minimal for the inventive Example 1 white, and significantly higher for the 2 Comparative Examples.

The lamination was aged 72 hours and then cut into one-inch-wide strips for bond strength evaluation using the Instron Material Testing Machine. The print substrate was clamped in one of the Instron's jaws and the backing substrate in the other. One jaw was raised slowly in attempts to pull apart the lamination while measuring the resistance caused by destroying the lamination. The jaw is raised until it has travelled a length of five inches, at which time an average of the resistance force (in grams/linear inch) is calculated and the mode of failure of the lamination determined. A "Destruct" mode of failure indicates that the bond between Ink/Adhesive/Film is greater than the strength of the film structures—i.e., the film tears or stretches before the adhesive fails.

Results are shown in Table 4.

TABLE 4

Adhesive Lamination bond strength comparison

| Adhesive Lamination NS2033/HA376 | Adhesive Lamination Bonds (PET/PE) | |
|---|---|---|
| | Bond Strength (g/in) | Mode of Failure |
| SL-800 STD White | 1000+ | Destruct |
| LAMINATIN STD White | 1000+ | Destruct |
| Ex. 1 | 1000+ | Destruct |

Table 4 shows that the Inventive Example 1 ink has similarly good adhesive lamination bond strength when compared to the two Comparative Examples.

Cold Seal Release Lacquer Structure/Test Method

The ink of Example 1 and the commercial SB high opacity flexo white ink SL-800 STD White (Sun Chemical) were reduced to 27-28" #2 Zahn EZ cup with 80/20 N-Propanol/N-Propyl Acetate Blend and reverse printed side-by-side on PET film with 250 LPI/6.36 BCM Anilox on a Harper bladed handproofer. Prints were evaluated with and without first down NULAM WHITE PRIMER, a commercial, lower opacity white printed with same anilox and viscosity that improves the adhesion of the High Opacity Whites to the substrate. BNL Opacity was measured with Technidyne TEST/Plus Opacity Meter.

A Cold Seal Release Lacquer was applied to the prints with a #8 Meyer Rod to yield a layer with a coat weight of ~0.85 lb/ream. BNL Opacity was measured again. Cold Seal Cohesive was applied to the corona treated side of a biaxially-oriented polypropylene (BOPP) substrate with a #10 Meyer Rod and a coat weight ~3.25 lb/ream. Prints were adhered to the Cold Seal Cohesive to form a Cold Seal Lamination Structure.

TABLE 5

Cold Seal Release Structure opacity comparison, with and without Primer White

| Cold Seal Release Lacquer (CSRL) | | BNL Opacity | | |
|---|---|---|---|---|
| With 1st Down Primer | Structure | Ink Only | w/ CSRL | Difference |
| SL-800 STD White | Primer + White | 66.4 | 62.6 | -3.8 |
| Ex. 1 | | 68.9 | 66.0 | -2.9 |
| SL-800 STD White | White Only | 60.8 | 57.0 | -3.8 |
| Ex. 1 | | 63.7 | 61.9 | -1.8 |

Table 5 shows the reduced loss of opacity for the Inventive Example 1 ink after application of the CSRL when compared to the SL-800 Comparative Example.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A high opacity solvent based white printing ink composition comprising:
   5 to 15% by weight based on the total weight of the ink composition, of a resin binder component, wherein the resin binder component comprises one or more alcohol soluble polyester resins, wherein at least one alcohol soluble polyester resin is substituted by hydroxyl, and wherein the hydroxyl substituted polyester resin comprises at least 5% by weight based on the total weight of the ink composition;
   more than 55% by weight based on the total weight of the ink composition, of a $TiO_2$ pigment; and
   one or more alcohol solvents;
wherein the ink has an un-reduced viscosity of from 15-100 centipoise, or 15 seconds #2 EZ Zahn cup to 35 seconds #2 EZ Zahn, and a reduced print viscosity of from about 10-80 cps, or 15 seconds #2 EZ Zahn to 35 seconds #2 EZ Zahn Cup;
   wherein the ink is suitable for flexographic or gravure printing; and
   characterized in that when the ink is printed and dried, it forms an ink film that exhibits a 10% or lower loss in opacity when the ink film is over-coated with an adhesive or lacquer.

2. The high opacity solvent based white printing ink of claim 1 comprising 60-70%, by weight, of a $TiO_2$ pigment based on the total weight of the ink composition.

3. The high opacity solvent based white printing ink of claim 1 comprising 55-65%, by weight, of a $TiO_2$ pigment based on the total weight of the ink composition.

4. The high opacity solvent based white printing ink of claim 1 comprising greater than or equal to 60%, by weight, of a $TiO_2$ pigment based on the total weight of the ink composition.

5. The high opacity solvent based white printing ink of claim 1 wherein the pigment to resin binder ratio is from 4:1 to 8:1 by weight.

6. The high opacity solvent based white printing ink of claim 1, wherein the solvent further comprises one or more acetate esters, ethers, glycols, glycol ethers, ketones or aldehydes.

7. The high opacity solvent based white printing ink of claim 1, wherein at least one alcohol soluble polyester resin is a soft polyester resin.

8. The high opacity solvent based white printing ink of claim 1, wherein the resin component further comprises a polyurethane resin.

9. The high opacity solvent based white printing ink of claim 8 wherein the polyurethane resin is an aliphatic polyether urethane resin.

10. The high opacity solvent based white printing ink of claim 1, wherein the printed and dried ink film exhibits a 5% or lower loss in opacity when over-coated with an adhesive or lacquer.

11. A method for providing a printed substrate, comprising printing one or more layers of the ink of claim 1 on a substrate and drying the one or more ink layers, wherein the printed and dried ink film exhibits a ≤10% loss in opacity after being overcoated with an adhesive or cold seal release lacquer.

12. The method of claim 11, wherein the printed and dried ink film exhibits a ≤5% loss in opacity after being over-coated with an adhesive or cold seal release lacquer.

13. The method of claim 11, wherein the substrate is a flexible film.

14. A printed substrate prepared by the method of claim 11.

15. The printed substrate of claim 11, wherein the printed substrate is a packaging structure.

16. The printed substrate of claim 15, wherein the packaging structure is a food packaging structure.

17. The high opacity solvent based white printing ink of claim 1, wherein the hydroxyl substituted polyester resin is Reactol™ 5145 A (gum rosin ester).

18. The high opacity solvent based white printing ink of claim 1 comprising 80-95%, by weight, of a TiO2 based on the total weight of the TiO2 pigment in the ink composition.

19. The high opacity solvent based white printing ink of claim 1, wherein the inks have a solid content of higher then 60% based on the total weight of the ink composition.

20. The high opacity solvent based white printing ink of claim 19, wherein the inks have a solid content of higher then 70% based on the total weight of the ink composition.

* * * * *